United States Patent
Gonidec et al.

(10) Patent No.: US 12,545,421 B2
(45) Date of Patent: Feb. 10, 2026

(54) AIR INTAKE LIP OF AN AIRCRAFT ENGINE NACELLE, COMPRISING AT LEAST ONE INFRARED EMISSION SOURCE

(71) Applicant: SAFRAN NACELLES, Gonfreville-l'Orcher (FR)

(72) Inventors: Patrick Gonidec, Moissy-Cramayel (FR); Jean-Paul Rami, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 146 days.

(21) Appl. No.: 17/614,146

(22) PCT Filed: May 14, 2020

(86) PCT No.: PCT/EP2020/063490
§ 371 (c)(1),
(2) Date: Nov. 24, 2021

(87) PCT Pub. No.: WO2020/239464
PCT Pub. Date: Dec. 3, 2020

(65) Prior Publication Data
US 2022/0219831 A1    Jul. 14, 2022

(30) Foreign Application Priority Data
May 27, 2019    (FR) ...................... 1905586

(51) Int. Cl.
*B64D 33/02*    (2006.01)
*B64C 7/02*    (2006.01)
(Continued)

(52) U.S. Cl.
CPC ............... *B64D 33/02* (2013.01); *B64C 7/02* (2013.01); *B64D 15/12* (2013.01); *B64D 29/00* (2013.01);
(Continued)

(58) Field of Classification Search
CPC ....................... B64D 2033/0233; F02C 7/047
See application file for complete search history.

(56) References Cited

U.S. PATENT DOCUMENTS

| | | | | |
|---|---|---|---|---|
| 6,328,258 B1 * | 12/2001 | Porte | ...................... | F02C 7/045 244/62 |
| 8,991,763 B2 * | 3/2015 | Guillermond | .......... | B64D 15/12 219/545 |
| 2012/0036826 A1 | 2/2012 | Dufresne De Virel et al. | | |

FOREIGN PATENT DOCUMENTS

| | | | | |
|---|---|---|---|---|
| DE | 69925448 T2 | 2/2006 | | |
| FR | 2986779 A1 * | 8/2013 | ............. | B64D 15/00 |

OTHER PUBLICATIONS

Search Report from the French Intellectual Property Office on corresponding FR application (FR1905586) dated Feb. 4, 2020.
(Continued)

*Primary Examiner* — Nicholas McFall
*Assistant Examiner* — Eric Acosta
(74) *Attorney, Agent, or Firm* — Alumen IP Law PC

(57) ABSTRACT

The invention relates to an air intake lip of an aircraft engine nacelle extending along an axis X, in which an air flow circulates from upstream to downstream, the lip extending annularly about the X-axis and having an inner wall facing the X-axis and an outer wall which is opposite the inner wall, the inner wall and the outer wall being connected by an upstream wall and a partition so as to delimit an annular cavity, in which at least one infrared emission source is housed, wherein at least one wall, selected among the inner wall, the outer wall and the upstream wall, is made of a material configured to transmit on an outer face at least 30% of the infrared received on an inner face.

20 Claims, 9 Drawing Sheets

(51) Int. Cl.
   *B64D 15/12*   (2006.01)
   *B64D 29/00*   (2006.01)
   *F02C 7/047*   (2006.01)
(52) U.S. Cl.
   CPC ...... *F02C 7/047* (2013.01); *B64D 2033/0233* (2013.01)

(56) References Cited

OTHER PUBLICATIONS

International Search Report and Written Opinion on corresponding PCT application (PCT/EP2020/063490) from International Searching Authority (EPO) dated Jul. 21, 2020.
Anonymous: "Reflexionsgrad—Wikipedia", Nov. 18, 2017, XP055664190, https://de.wikipedia.org/wiki/Reflexionsgrad, Figure 1.

* cited by examiner

AIR INTAKE LIP OF AN AIRCRAFT ENGINE NACELLE, COMPRISING AT LEAST ONE INFRARED EMISSION SOURCE

TECHNICAL FIELD

The present invention relates to the field of aircraft turbomachines and is more particularly directed to a device for de-icing an air intake lip of an aircraft turbomachine nacelle.

In a known manner, an aircraft comprises one or more turbomachines to enable its propulsion by acceleration of an air flow circulating from upstream to downstream in the turbomachine.

With reference to FIG. 1, there is represented a turbomachine 100 extending along an axis X and comprising a fan 101 rotatably mounted about axis X in a nacelle comprising an external shell 102 in order to accelerate an air flow F from upstream to downstream. Hereinafter, the terms upstream and downstream are defined in relation to the circulation of the air flow F. At its upstream end, the turbomachine 100 comprises an air intake 200 for separating the incoming air flow F into an internal air flow FINT which is accelerated by the fan 101 and an external air flow FEXT which is guided externally to the nacelle. The air intake 200 comprises an upstream part, known to the person skilled in the art as a lip, and a downstream portion.

The lip comprises an internal wall 201 pointing to axis X and an external wall 202 that is opposite to the internal wall 201, the walls 201, 202 are connected by an upstream wall 203 and a partition wall 205 so as to form an annular cavity 204 known to the person skilled in the art as a "D-Duct". Thus, the lip enables the incoming air flow F to be separated into an internal air flow FINT guided by the internal wall 201 and an external air flow FEXT guided by the external wall 202. Hereinafter, the terms internal and external are defined radially in relation to axis X of the turbomachine 100.

In a known manner, during the flight of an aircraft, due to temperature and pressure conditions, ice is likely to build up at the upstream wall 203, the external wall 202 and the internal wall 201 of the lip to form blocks of ice that are likely to be ingested by the turbomachine 100. Such ingestions have to be avoided in order to improve the life of the turbomachine 100 and reduce malfunctions.

To avoid ice buildup, with reference to FIG. 1, it is known from patent application FR2986779A1 to equip the nacelle with a de-icing device 209 that emits infrared radiation in order to heat part of the air intake located in an opposed relationship and melt the ice built up on the internal wall 201. In practice, the nacelle comprises an enclosure 219 in which the de-icing device 209 is mounted to emit the infrared radiation onto a diametrically opposite portion of the air intake 200. The enclosure 219 is positioned downstream of the annular cavity 204 of the lip, that is, in a zone of the nacelle for receiving acoustic treatment panels.

Such a solution has the drawback of not enabling ice to be removed from the entire lip surface. In particular, ice built up on the external wall 202 cannot be removed. In addition, an infrared de-icing device 209 has a significant power consumption, which affects the energy efficiency of the nacelle and, more generally, the turbomachine. Moreover, when the thickness of the layer of ice is significant, it is necessary to provide a large amount of heating power in order to melt it completely. Finally, the presence of such a de-icing device affects the acoustic attenuation performance since it increases the overall size and reduces the surface area available for the installation of acoustic treatment panels.

Besides, an air lip comprising an annular cavity in which an infrared de-icing device is mounted so as to heat an air intake lip by thermal conduction is known from patent application FR2930234A1.

One of the purposes of this patent application to provide a nacelle air intake lip comprising a de-icing device that eliminates at least some of these drawbacks.

SUMMARY

The invention relates to an air intake lip of an aircraft turbomachine nacelle extending along an axis X in which an air flow circulates from upstream to downstream, the lip annularly extending about axis X and comprising an internal wall pointing to axis X and an external wall which is opposite to the internal wall, the internal wall and the external wall being connected by an upstream wall and a partition wall so as to delimit an annular cavity in which at least one infrared emission source is housed.

The invention is remarkable in that at least one wall, selected from the internal wall, the external wall and the upstream wall, is made of a material configured to transmit, on an outer face of said wall, at least 30% of the infrared rays received on an inner face of said wall. The terms "inner" and "outer" are defined in relation to the annular cavity. Thus, each wall of the lip comprises an inner face pointing to the annular cavity and an outer face that is opposite to the inner face.

Infrared rays thus circulate through the material. Advantageously, 30% of the infrared rays received on an inner face is sufficient to locally melt the interface between the layer of ice and the wall to be de-iced, enabling quick convenient removal of a layer of ice. It is not necessary to melt it completely to remove it as in prior art. In addition, an infrared emission source in the annular cavity ensures that the overall size downstream of the annular cavity is not increased. Acoustic attenuation panels can thus be positioned without difficulty.

Preferably, at least the internal wall is made of a material configured to transmit, on an outer face of said wall, at least 30% of the infrared rays received on an inner face of said wall.

Preferably, at least two walls selected from the internal wall, the external wall and the upstream wall are made of a material configured to transmit on an outer face at least 30% of the infrared rays received on an inner face, more preferably all 3 walls. This advantageously enables the walls of the air intake lip to be heated locally to achieve their de-icing.

According to one aspect, the internal wall comprises at least one first portion made of a material configured to transmit on an outer face at least 60% of the infrared rays received on an inner face. Such a transparent wall enables infrared to be transmitted remotely for remote de-icing.

According to one aspect, the internal wall comprises at least one second portion that comprises an inner face of internal wall configured to reflect at least 50% of the infrared rays received on an inner face of the internal wall. Part of the reflected infrared can thus be used to de-ice other local walls or perform remote de-icing.

Preferably, at least one inner face of a wall, selected from the internal wall, the external wall, or the upstream wall, comprises at least two parallel surfaces that are offset from each other. This enables infrared to be precisely focused onto a portion of a wall of the air intake lip.

According to one aspect, the external wall comprises an inner face of external wall configured to reflect at least 50% of the infrared rays received on the inner face of the external wall. Part of the reflected infrared can thus be used to de-ice other local walls or perform remote de-icing.

According to one aspect, the upstream wall comprises an inner face of upstream wall configured to reflect at least 50% of the infrared rays received on the inner face of upstream wall. Part of the reflected infrared can thus be used to de-ice other local walls or perform remote de-icing.

According to one aspect, the partition wall comprises an inner face of partition wall configured to reflect at least 50% of the infrared rays received on the inner face of the partition wall. Such a partition wall makes it possible to fulfill a reflector function and thus concentrate infrared rays for local and/or remote de-icing.

Preferably, the infrared emission source is offset longitudinally upstream from the first portion of the internal wall. Advantageously, this enables local de-icing by transparency of the walls of the air intake lip. Further, this provides a first portion optimally positioned to concentrate infrared rays for remote de-icing of an opposite portion of the air intake lip.

Preferably, the external wall comprises at least one heated air discharge opening. Thus, the annular cavity can be conveniently cooled by an external air flow.

According to one aspect of the invention, the lip comprises at least one circumferential transparent wall mounted to the partition wall in the annular cavity so as to delimit an annular duct, the infrared emission source being mounted in said annular duct. Advantageously, this enables the infrared emitting source to be cooled independently of the annular cavity which may be at an optimal temperature for de-icing the walls of the air intake lip.

By "transparent material", it is meant a material configured to transmit on an outer face at least 60% of the infrared rays received on an inner face.

Preferably, the partition wall comprises at least one heated air discharge opening. Thus, the annular duct can be cooled without interaction with the annular cavity.

Preferably, the lip comprises at least one ice detection means configured to deactivate the infrared emission source in the absence of ice.

Preferably, the infrared emission source comprises at least one infrared emitter and at least one calculator configured to control the infrared emitter based on the presence or absence of ice. Thus, the infrared emission can be stopped when the layer of ice has been removed, in particular, to save energy.

Preferably, the ice detection means comprises at least one emission source of detection waves and at least one sensor for measuring the reflection of the detection waves by the layer of ice. The presence of ice is thus detected indirectly based on the detection waves reflected by the layer of ice.

The invention relates to an air intake of an aircraft turbomachine nacelle extending along an axis X in which an air flow circulates from upstream to downstream, comprising a lip as set forth above. Preferably, the air intake comprises an upstream part, formed by the lip, and a downstream part on which the lip is mounted.

The invention also relates to a method for de-icing an air intake lip as set forth above, the method comprising:

a step of activating the infrared emission source in the annular cavity so as to emit infrared rays on the inner face of at least one wall selected from the internal wall, the external wall and the upstream wall, and a step of transmitting to the outer face of said wall having received infrared rays at least 30% of the infrared rays received on the inner face of said wall.

Local internal heating enables a layer of ice to be removed without melting it entirely or sublimating the ice into vapor, which provides a significant energy gain. Further, the entire air intake lip can be locally de-iced by transparency.

Preferably, the method comprises a step of detecting the presence of ice on the outer face of said wall having received infrared rays and a step of inhibiting the infrared emission source in the absence of ice.

Intermittent de-icing by infrared emissions is energetically advantageous because the infrared emission source is not continuously activated. Such intermittent operation remains efficient because of the high responsivity of the infrared emission source and the fact that heating is performed locally from inside.

By virtue of the invention, the infrared emission source makes it possible to de-ice an internal wall, an external wall and an upstream wall quickly and economically in comparison with prior art which uses a confined infrared emission source.

BRIEF DESCRIPTION OF THE DRAWINGS

The invention will be better understood upon reading the following description, which is given only by way of example, and with reference to the appended drawings given by way of non-limiting examples, in which identical references are given to similar objects and in which.

It should be noted that the figures set out the invention in detail to implement the invention, said figures can of course be used to better define the invention if necessary.

DETAILED DESCRIPTION

Figure 1:
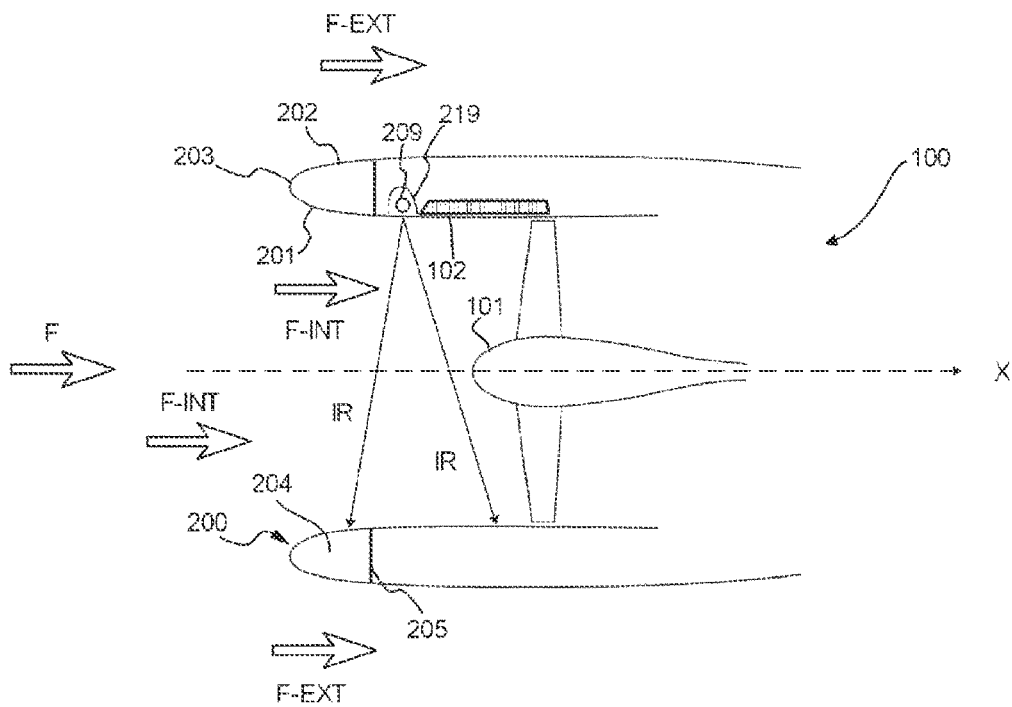
FIG. 1 is a schematic representation of a turbomachine in a longitudinal cross-section view according to prior art.
Figure 2:
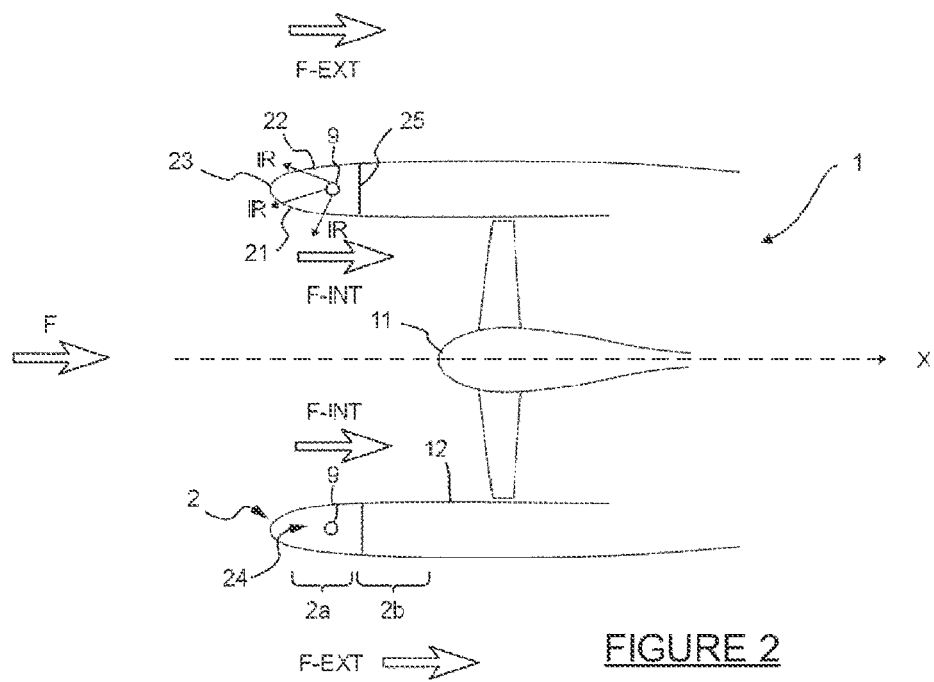
FIG. 2 is a schematic representation of a turbomachine in a longitudinal cross-section view according to an embodiment of the invention.

With reference to FIG. 2, a turbomachine 1 extending along an axis X and comprising a fan 11 rotatably mounted about axis X in a nacelle comprising an external shell 12 in order to accelerate an air flow F from upstream to downstream is represented. Hereinafter, the terms upstream and downstream are defined in relation to the circulation of the air flow F. At its upstream end, the turbomachine 1 comprises an air intake 2 comprising an upstream part 2a, known to the person skilled in the art as a lip 2a, and a downstream part 2b. In this example, the lip 2a is separated from the downstream part 2b by a partition wall 25.

The lip 2a comprises an internal wall 21 pointing to axis X and an external wall 22 that is opposite to the internal wall 21, the walls 21, 22 are connected by an upstream wall 23 and a partition wall 25 so as to delimit an annular cavity 24 known to the person skilled in the art as a "D-Duct". Thus, the lip 2a separates the incoming air flow F into an internal air flow FINT guided by the internal wall 21 and an external air flow FEXT guided by the external wall 22. Hereinafter, the terms "internal" and "external" are defined radially in relation to axis X of the turbomachine 1. Analogously, hereinafter, the terms "inner" and "outer" are defined in relation to the annular cavity 24. Thus, each wall of the lip 2a comprises an inner face pointing to the annular cavity 24 and an outer face that is opposite to the inner face. In this example, the turbomachine 1 is a turbojet engine.

The partition wall 25, also referred to as the front wall, is mounted, preferably substantially radially, between the internal wall 21 and the external wall 22.

Figure 3:
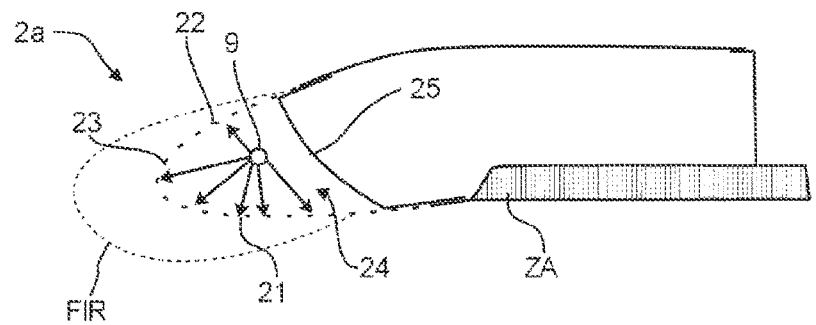
FIG. 3 is a close-up schematic representation, in a longitudinal half cross-section view, of an air intake lip according to the invention.

In this example, the nacelle further comprises an acoustic attenuation panel ZA downstream of the annular cavity 24 as an extension of the internal wall 21 as illustrated in FIG. 3. Such an acoustic panel ZA is known to the skilled person and will not be set forth in further detail.

According to the invention, the lip 2a comprises at least one infrared emission source 9 in the annular cavity 24. The internal wall 21, the external wall 22 and/or the upstream wall 23 are made of a material configured to transmit on an outer face at least 30% of the infrared rays received on an inner face. For the sake of clarity and brevity, such a material is hereinafter referred to as "semi-transparent".

In other words, contrary to prior art which taught to confine the infrared emission source 9 in an enclosure with reduced dimensions downstream of the annular cavity 24 in order to perform only remote de-icing of a diametrically opposite portion of the air intake, the present invention makes it possible to perform local de-icing "by transparency" by heating the interface between the layer of ice and the wall on which it is formed.

Preferably, the infrared emission source 9 comprises a plurality of infrared emitters, in particular diodes or infrared resistors, emitting electromagnetic radiation with an emission spectrum between 0.7 and 12 μm. Preferably, the wavelength is determined to have maximum emissivity/absorption with respect to the water constituting the ice.

According to a first embodiment, with reference to FIG. 3, the lip 2a comprises an internal wall 21, an external wall 22 and an upstream wall 23 which are semi-transparent in order to enable a layer of ice to be heated by infrared transmission. Thus, the infrared emission source 9 generates an infrared flow FIR which heats the outer surface of the internal wall 21, the external wall 22 and the upstream wall 23. Such a configuration has many advantages as the internal wall 21, the external wall 22 and the upstream wall 23 are conveniently and efficiently de-iced.

In this embodiment, the internal wall 21, the external wall 22 and the upstream wall 23 are made of a material configured to transmit on an outer face at least 60% of the infrared rays received on an inner face. For the sake of clarity and brevity, such a material is hereinafter referred to as "transparent".

Figure 4:
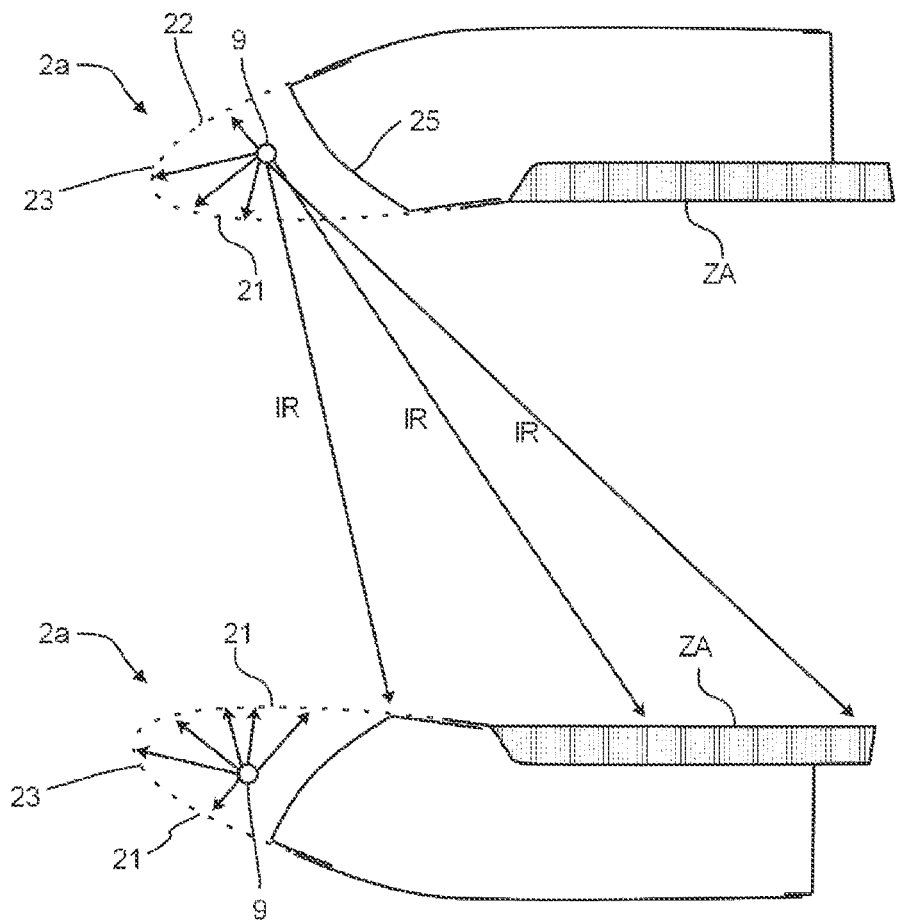
FIG. 4 is a schematic representation, in a longitudinal cross-section view, of an air intake lip according to the invention during a remote de-icing.

Such a transparent material makes it possible to transmit infrared remotely, in particular, to perform remote heating of a diametrically opposite portion of the air intake 2 (FIG. 4). As will be set forth hereinafter, the internal wall 21 comprises at least one first portion made of a transparent material in order to perform heating of a diametrically opposite portion of the air intake 2.

By way of example, the internal wall 21, the external wall 22, and the upstream wall 23 are made of one or more of the following materials: glass ceramic, polyethylene, polycarbonate, polymethyl methacrylate, and the like. The inner/outer faces may undergo surface treatments to adapt their infrared transmission/reflection properties.

In this example, the internal wall 21, the external wall 22 and the upstream wall 23 are all made of an at least semi-transparent material, but of course only one or two walls selected from the internal wall 21, the external wall 22 and the upstream wall 23 could be made of an at least semi-transparent material.

The advantages of de-icing according to the invention will be explained by comparison with "external" de-icing as described in prior art.

Figure 5A:
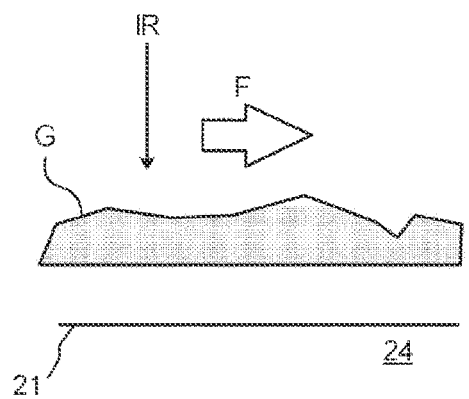
FIGS. 5A through 5C are schematic representations of remote external de-icing, conduction internal de-icing, and transmission internal de-icing.

As illustrated in FIG. 5A, for remote external de-icing, in order to remove a layer of ice G from the internal wall 21, the infrared IR has to completely melt the thickness of the layer of ice G. The infrared emission time and power are significant, which consumes significant energy.

Figure 5B:
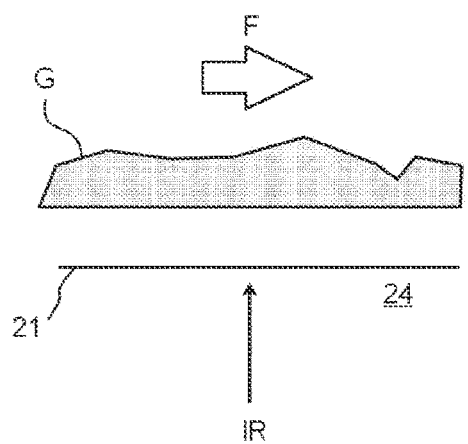

With reference to FIG. 5B, for an opaque wall, that is comprising a material configured to transmit on an outer face less than 30% of the infrared rays received on an inner face, the infrared IR heats the internal wall 21 which rises in temperature. The layer of ice G melts slowly by thermal conduction and consumes significant energy.

Figure 5C:
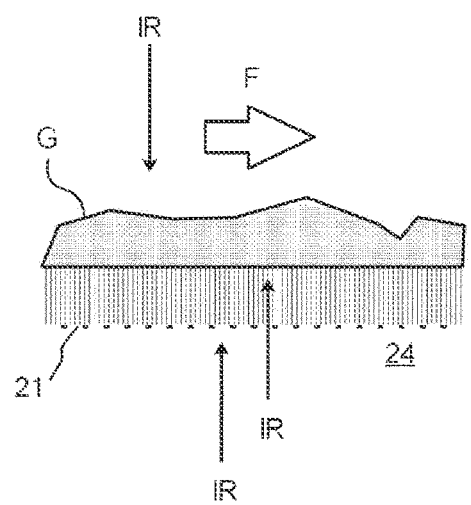

With reference to FIG. 5C, for a semi-transparent or transparent wall, accelerated local heating is achieved as the infrared IR directly reaches the interface between the layer of ice G and the internal wall 21. A film of liquid water or vapor forms between the layer of ice G and the internal wall 21, which facilitates detachment of the layer of ice G. In other words, removal of the layer of ice G is accelerated in comparison with prior art since it is not necessary to melt the entire thickness of the layer of ice G to achieve its removal. By virtue of the invention, the layer of ice G is eliminated quickly while using less energy. In practice, during de-icing, the layer of ice G directly receives infrared whose wavelength has been determined to have maximum emissivity/absorption with respect to the water constituting the ice.

Advantageously, a semi-transparent wall filters only a small part of the radiation energy, the interface between the layer of ice and the wall receiving the infrared IR radiation directly and almost instantaneously. Therefore the ice at the interface melts very quickly. The response time is almost instantaneous since it does not depend on the time of establishment of a convective flow, nor on the heating of the wall by thermal conduction. The walls of the lip 2a are maintained at a temperature above 0° C., which prevents icing.

Figure 6:
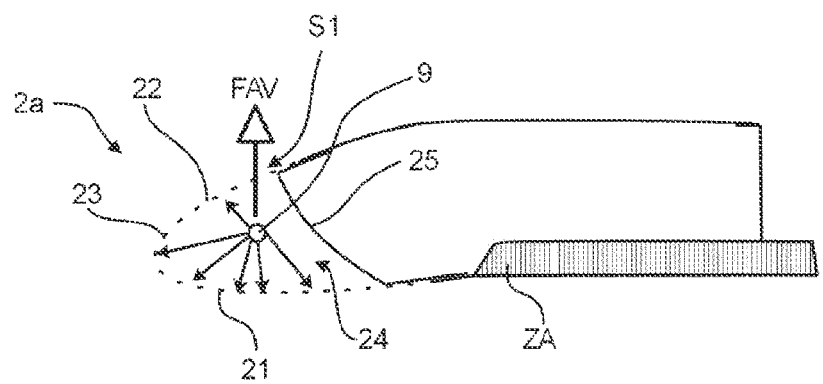
FIGS. 6 and 7 are longitudinal and transverse schematic representations of an air intake lip.
Figure 7:
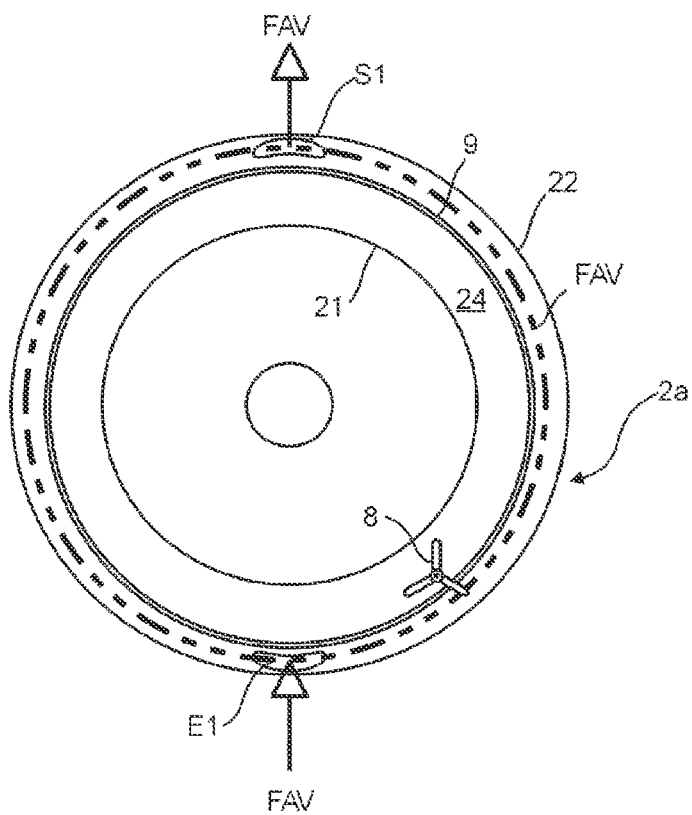

According to one aspect of the invention, with reference to FIGS. 6 and 7, the lip 2a comprises at least one ventilation inlet E1 and one ventilation outlet S1 configured to enable circulation of a ventilation air flow FAV in the annular cavity 24 in order to cool the infrared emission source 9. Preferably, the ventilation inlet E1 and the ventilation outlet S1 are formed in the external wall 22, in particular, diametrically opposite as illustrated in FIG. 7. Part of the external air flow is taken in through the ventilation inlet E1, circulates in the annular cavity 24 in contact with the infrared emission source 9 and then escapes through the ventilation outlet S1. Optionally, with reference to FIG. 7, the lip 2a comprises at least one acceleration member 8, for example a fan, to accelerate the ventilation air flow FAV in the annular cavity 24 and thus improve cooling. Overheating of the infrared emission source 9 is thus avoided.

Figure 8:
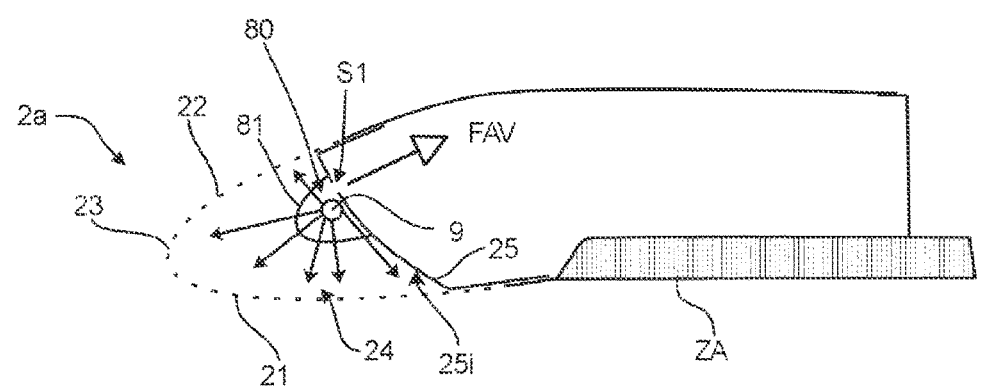
FIGS. 8 and 9 are longitudinal and transverse schematic representations of an air intake lip with an annular duct.
Figure 9:
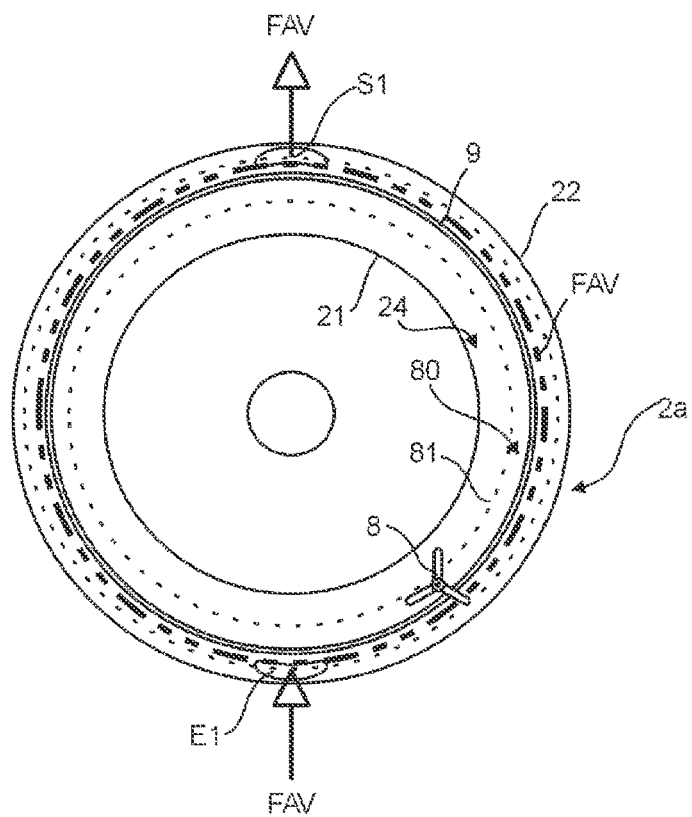

According to another aspect of the invention, with reference to FIGS. 8 and 9, the lip 2a comprises at least one circumferential transparent wall 81 mounted to an inner face 25i of the partition wall 25 in the annular cavity 24 so as to delimit an annular duct 80. The infrared emission source 9 is mounted in said annular duct 80. In other words, the infrared emission source 9 is not mounted in a directly opposed relationship to the inner surface of the internal wall 21, the external wall 22 and the upstream wall 23 but is housed in an annular duct 80 which can be ventilated independently of the annular cavity 24. This is highly advantageous for effectively cooling the infrared emitting source 9 by maintaining a low temperature in the annular duct 80, whereby the temperature in the annular cavity 24 can be higher to ensure optimal de-icing of the internal wall 21, the external wall 22 and the upstream wall 23.

Analogously to above, with reference to FIG. 9, the annular duct 80 comprises at least one ventilation inlet E1 and one ventilation outlet S1 configured to enable circulation of a ventilation air flow FAV in the annular duct 80 in order to cool the infrared emission source 9. Preferably, the ventilation inlet E1 and the ventilation outlet S1 are formed in the partition wall 25, in particular, diametrically opposite as illustrated in FIG. 9. Optionally, with reference to FIG. 9, the lip 2a comprises at least one acceleration member 8, for example a fan, to accelerate the ventilation air flow FAV in the annular duct 80 and thereby improve cooling.

Figure 10A:
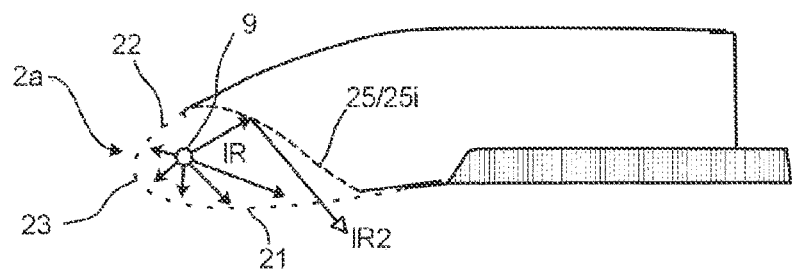
FIGS. 10A-10D and 11 are longitudinal schematic representations of several embodiments of an air intake lip according to the invention.

According to one aspect of the invention, with reference to FIG. 10A, the partition wall 25 comprises an inner face 25i configured to reflect at least 50% of the infrared rays received on the inner face. For the sake of clarity and brevity, such an inner face is hereinafter referred to as "semi-reflective".

The partition wall 25 enables the infrared IR received in the annular cavity 24 to be reflected in order to channel them and enable optimal de-icing of the internal wall 21, the external wall 22 and the upstream wall 23. In other words, any infrared IR emitted by the infrared emission source 9 generates a reflected infrared IR2 in contact with the partition wall 25 which then comes into contact with the internal wall 21, the external wall 22 or the upstream wall 23. In this example, the internal wall 21, the external wall 22 or the upstream wall 23 are at least semi-transparent.

The infrared emission source 9 emits omnidirectionally and the partition wall 25 makes it possible to concentrate the infrared on the walls to be de-iced. Advantageously, the use of such a partition wall 25 makes it possible to adjust incidence of the infrared by adapting the shape of the partition wall 25 and by judiciously positioning the infrared emission source 9 in the annular cavity 24.

Preferably, in order to optimally concentrate the infrared IR, the partition wall 25 comprises an inner face 25i configured to reflect at least 80% of the infrared rays received on the inner face. For the sake of clarity and brevity, such an inner face is hereinafter referred to as "reflective". Analogously, an inner face configured to reflect less than 30% of the infrared rays received on the inner face is hereinafter referred to as "non-reflective". The inner face 25i of the partition wall 25 thus performs a reflector function for infrared rays.

Figure 10B:
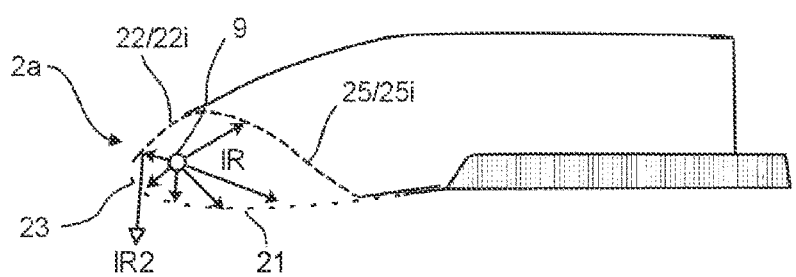

According to one aspect of the invention, with reference to FIG. 10B, the external wall 22 further comprises an inner face 22i which is semi-reflective or reflective so as to reflect the infrared IR towards the annular cavity 24 in particular towards the upstream wall 23 and the internal wall 21 which are semi-transparent (or transparent) and non-reflective. Furthermore, this enables radiation outside the annular cavity 24 to de-ice another portion of the lip 2a from outside.

According to one aspect of the invention not represented, the upstream wall 23 further comprises an inner face that is semi-reflective so as to reflect infrared towards the annular cavity 24 in particular towards the internal wall 21 which is semi-transparent (or transparent) and non-reflective. This enables the infrared to be concentrated towards the internal wall 21 which is most likely to receive ice. Furthermore, this enables radiation outside the annular cavity 24 to de-ice another portion of the lip 2a from outside.

Figure 10C:
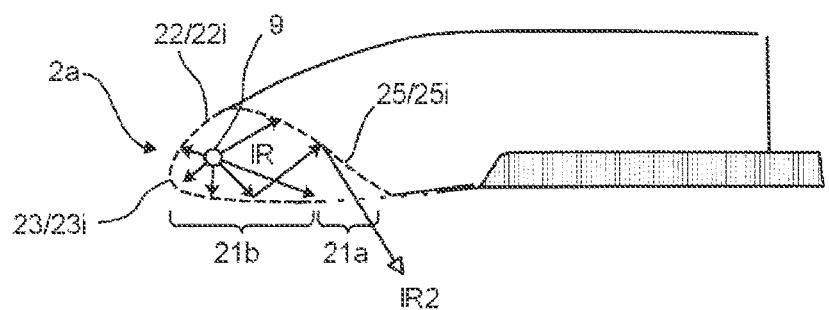

According to another aspect of the invention, with reference to FIG. 10C, the internal wall 21 comprises a first portion 21a made of a semi-transparent (or transparent) and non-reflective material and a second portion 21b which comprises an inner face that is at least semi-reflective so as to promote infrared transmission through the first portion 21a while allowing de-icing of the other parts of the lip 2a by allowing transmission of at least 30% of the infrared. With reference to FIG. 10C, the first portion 21a is a downstream portion of the internal wall 21 so as to benefit from an angle of incidence that enables for optimal external de-icing.

Figure 11:
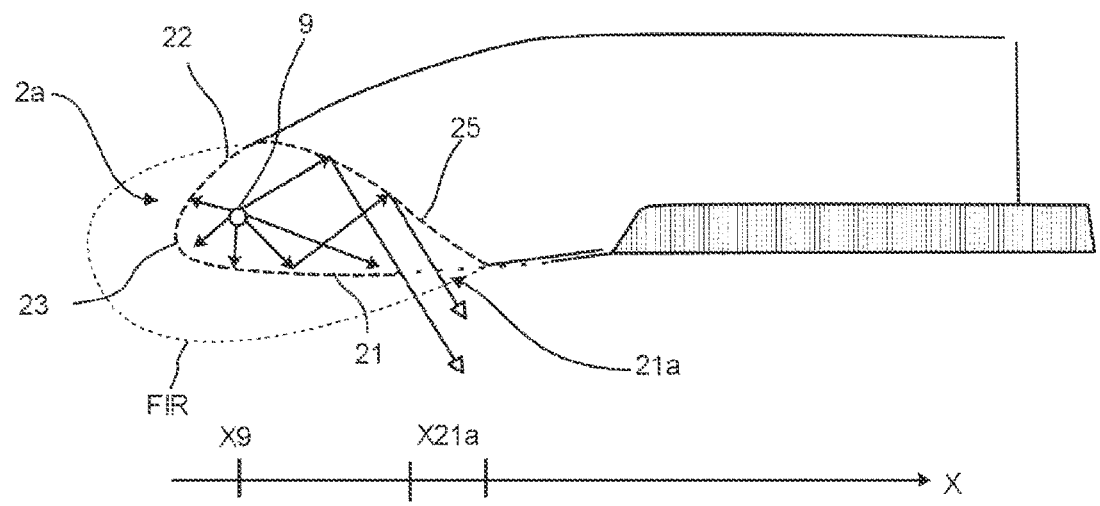

As illustrated in FIG. 11, only a first portion 21a of the internal wall 21 is non-reflective and forms an outlet for infrared IR that is reflected into the annular cavity 24. In this embodiment, the infrared emission source 9 is longitudinally offset from the first portion 21a of the internal wall 21. In this example, with reference to FIG. 11, the infrared emission source 9 (position X9) is upstream of the first portion 21a of the internal wall 21 (position X21a), that is, in proximity to the upstream wall 23. Such an axial offset is advantageous for several reasons. First of all, the proximity between the infrared emission source 9 and the upstream wall 23 enables for optimal de-icing of the upstream wall 23 and the internal wall 21 and the external wall 22 located in the vicinity, that is, in the perimeter of the infrared flow FIR transmitted through the lip 2a. In addition, the first portion 21a of the internal wall 21 is optimally positioned to perform remote external de-icing by collecting the reflected infrared IR2 from the various reflective surfaces and focus them onto a remote, preferably diametrically opposite wall. Such a configuration advantageously enables for local internal de-icing but also for remote external de-icing.

Figure 10D:
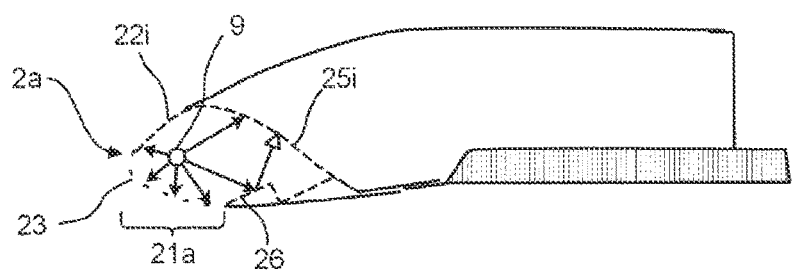

According to another aspect of the invention, with reference to FIG. 10D, a semi-reflective or reflective inner face may comprise a plurality of surfaces 26 offset from each other, that is, Fresnel surfaces, in order to guide the reflected infrared IR optimally. The surfaces 26 are preferably conical. An internal wall 21 comprising Fresnel surfaces 26 is represented in FIG. 10D, but of course such a surface could be formed on one or more walls selected from the internal wall 21, the external wall 22, the upstream wall 23, and the partition wall 25.

Figure 12:
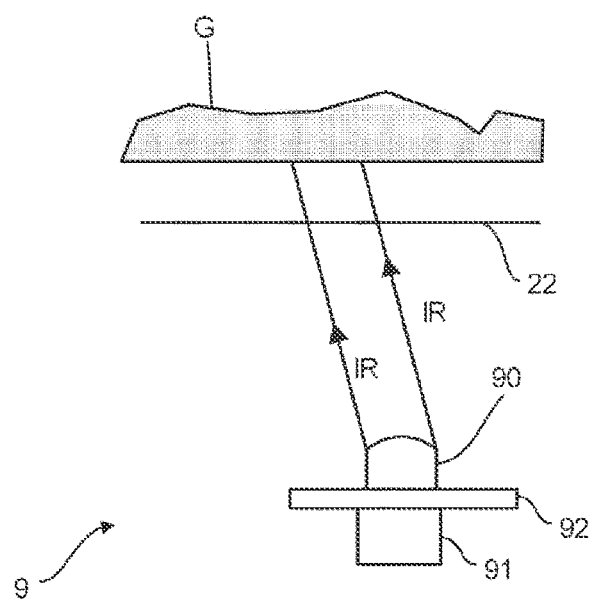
FIG. 12 is a schematic representation of an infrared emission source.

With reference to FIG. 12, the infrared emission source 9 comprises a plurality of infrared emitters, in particular infrared diodes 90 or any other infrared lamp, a calculator 91 configured to control the infrared diodes 90 according to the presence of ice. Preferably, the infrared diodes 90 and the calculator 91 are mounted to a same electronic board 92. By way of example, the calculator 91 is in the form of a processor connected to the electronic board 92.

Figure 13:
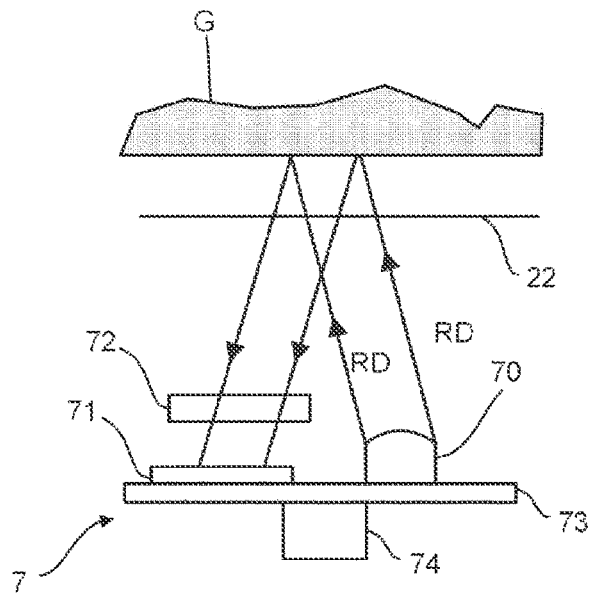
FIGS. 13 and 14 are schematic representations of an ice detection means.
Figure 14:
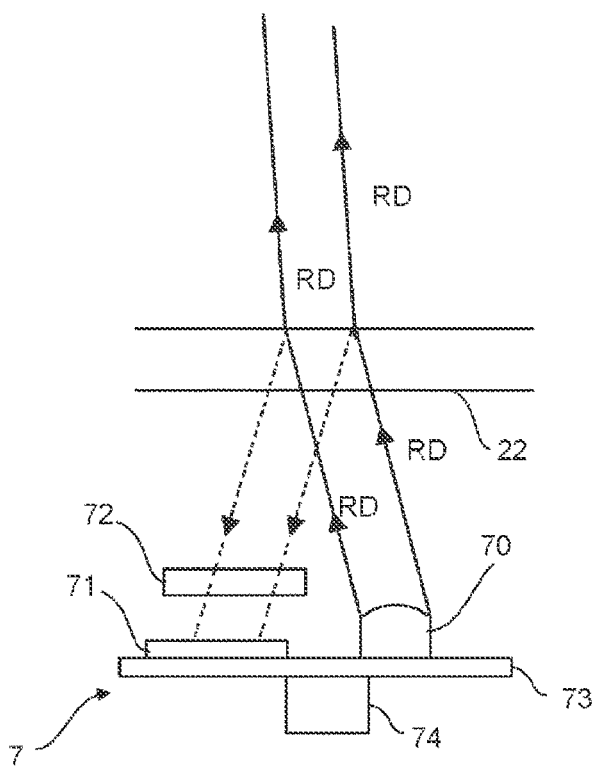

With reference to FIGS. 13 and 14, there is represented an ice detection means 7 comprising an emission source 70 of detection waves RD, in particular light-emitting diodes, and a measurement sensor 71 for measuring reflection of the detection waves RD by the layer of ice G. With reference to FIGS. 13 to 14, the emission source 70 of detection waves RD and the measurement sensor 71 are mounted to a same electronic board 73 with a calculator 74. Preferably, the ice detection means 7 comprises a power source not represented. Preferably, the detection waves RD have a wavelength that is different from that of the infrared IR waves used for de-icing. Preferably, the detection waves RD are electromagnetic waves preferably having a wavelength between 0.7 and 1.7 µm. Such electromagnetic waves are advantageous since the layer of ice G has a significant reflectivity for said wavelength range.

Preferably, the ice detection means 7 is distributed at the circumference of the upstream wall 23.

Preferably, the ice detection means 7 is connected to the infrared emission source 9 so as to control the infrared IR emission according to the presence of ice. By way of example, the calculator 74 of the emission source 70 of detection waves RD is configured to exchange data with the calculator 91 of the infrared emission source 9.

In this embodiment, the ice detection means 7 further comprises a filter 72, which is arranged in front of the measurement sensor 71 so as to stop stray radiation, in particular from infrared emission sources 9 used for de-icing. Preferably, the filter 72 has a bandwidth of between 0.7 and 1.7 µm and is capable of absorbing a large part of the infrared radiation emitted by these other sources and whose energy spectrum lies beyond the 1.7 µm wavelength.

In this example, the measurement sensor 71 is configured to measure detection waves RD along a direction in order to determine the fraction of the detection waves RD that is reflected by ice. Such a measurement sensor 71 is thus sensitive to electromagnetic waves. Such a measurement sensor 71 enables the presence of a layer of ice G on the outer face of the wall to be detected directly. Indeed, the more significant the fraction of detection waves RD reflected, the thicker the layer of ice G and the more it reflects the detection waves RD. Conversely, the lower the fraction of reflected detection waves RD, the thinner the layer of ice G and the more it transmits the detection waves RD. Preferably, the lip 2a comprises a plurality of measurement sensors 71 arranged at the circumference of the lip 2a.

Alternatively, the ice detection means 7 comprises one or more piezoelectric sensors placed in the annular cavity 24 in order to detect Lamb waves in the wall to be de-iced and deduce the presence or absence of ice therefrom.

Alternatively, the ice detection means 7 comprises one or two infrared measurement cameras, each equipped with a wide angle lens, which can be used to measure the presence of ice. Such cameras are preferably positioned outside the annular cavity 24 of the lip 2a.

Several implementations of the invention will now be set forth for de-icing an external wall 22, but the teaching applies to the internal wall 21 or the upstream wall 23, whether it is semi-transparent or transparent. Better results are nevertheless obtained for a transparent wall.

First of all, the infrared emission source 9 can be activated substantially continuously in icing conditions so as to melt the layer of ice G and maintain it as liquid water until it is ingested by the fan 11.

The infrared emission source 9 makes it possible to heat the entire surface of the external wall 22 to a positive temperature, for example in the order of 5° C., to keep the liquid water upstream of the fan 11. Advantageously, the layer of ice G is not vaporized, which provides energy savings. This solution is all the more interesting that the relevant surface to be maintained at a positive temperature is small, as the energy required is then reduced.

Alternatively, the infrared emission source 9 can be activated intermittently so as to detach the layer of ice G into pieces of solid ice.

Since the infrared emission source 9 has a low response time, for example in the order of one second to reach maximum power, intermittent de-icing can be performed to limit energy consumption. In practice, the infrared emission source 9 can be stopped to allow a thin layer of ice for a predetermined period of time, for example, between one and thirty seconds. The infrared emission source 9 is then activated, for example, for one to thirty seconds, so as to loosen the layer of ice from the wall by melting only the thin interface between the layer of ice and the wall. The layer of ice G is then carried away by the surrounding air flow in small fragments that are absorbed by the turbomachine. Intermittent use enables a significant energy gain because only the interface with the wall needs to be melted, a large part of the layer of ice G remaining solid.

The infrared energy density can be either uniformly distributed or enhanced by focusing the infrared radiation, in particular, in a meshing whose mesh size is small, for example, in the order of about ten millimeters. Meshed focusing advantageously makes it possible to calibrate size of the fragments of the layer of ice G and facilitates their discharge by the air flow.

As will be set forth hereinafter, the activation control of the infrared emission source 9 is determined according to the detection of the ice. Alternatively, the control could be performed by analyzing the temperature of the annular cavity 24. For this purpose, the lip 2a may comprise one or more temperature sensors placed on the inner surface or the outer surface of the wall to be de-iced.

In FIG. 13, a layer of ice G is present on the outer surface of the external wall 22, the emission source 70 emits detection waves RD towards the external wall 22, a fraction of which is reflected by the layer of ice G and measured by the measurement sensor 71. Thus, the reflected detection waves RD pass twice through the external wall 22. Advantageously, absorption losses in the material of the external wall 22 are low given its high transmittance over the wavelength range.

In this example, the filter 72 eliminates any stray infrared radiation for ice detection. The calculator 74 compares the measured fraction to a predetermined threshold to determine the presence or absence of ice. Preferably, the threshold is feedback calibrated.

In other words, when few reflected RD detection waves are detected (FIG. 14), it is deduced therefrom that the layer of ice G has disappeared. Preferably, when the calculator 74 detects an absence of ice, a stop instruction is issued by the calculator 74 of the ice detection means 7 to the calculator 91 of the emission source 9, which advantageously limits energy consumption.

When a new layer of ice G appears, the light-emitting diodes 90 of the infrared emission source 9 are activated again. The activation latency time is calibrated so as to avoid formation of a thick layer of ice. The latency time is, for example, parameterized according to the transmittance and conduction properties of the material of the wall to be de-iced.

Advantageously, such a de-icing device provides a gain in mass in comparison with a traditional pneumatic de-icing device. Furthermore, the de-icing power required for de-icing by semi-transparency or transparency is divided by a factor of 5 to 20, which is energetically very advantageous.

Indeed, it is especially no longer necessary to sublimate all of the solid ice into vapor as in prior art.

The complexity of the nacelle is also reduced and the space dedicated to mounting acoustic attenuation panels is not affected. The acoustic attenuation properties are thus preserved. Moreover, the presence of a transparent portion in the internal wall enables combination of local heating with remote heating, which improves de-icing quality and speed. The various semi-reflective or reflective inner faces act as a concentrator, optimizing the use of the infrared emission source for remote de-icing.

The invention claimed is:

1. A lip of an air intake of an aircraft turbomachine nacelle extending along an axis X in which an air flow circulates from upstream to downstream, the lip annularly extending about the axis X and comprising:
   an internal wall pointing to the axis X;
   an external wall opposing the internal wall;
   wherein the internal wall and the external wall being connected by an upstream wall and a partition wall so as to delimit an annular cavity at an upstream-most end section of the aircraft turbomachine nacelle;
   at least one infrared emission source housed in the annular cavity; and
   wherein at least one wall, selected from the internal wall, the external wall, and the upstream wall, is made of a material configured to transmit, on an outer face of said wall, at least 30% of infrared rays received on an inner face of said wall, and the lip comprising at least one circumferential transparent wall mounted to the partition wall in the annular cavity so as to delimit an annular duct, and wherein the at least one infrared emission source is mounted in said annular duct.

2. The lip according to claim 1, wherein the internal wall comprises at least one first portion made of a material configured to transmit, on an outer face of said wall, at least 60% of the infrared rays received on an inner face of said wall.

3. The lip according to claim 2, wherein a source for emitting the infrared rays is longitudinally offset upstream from the at least one first portion of the internal wall.

4. The lip according to claim 1, wherein the internal wall comprises at least one second portion which comprises an inner face that is configured to reflect at least 50% of the infrared rays received on the inner face of the internal wall.

5. The lip according to claim 1, wherein the external wall comprises an inner face that is configured to reflect at least 50% of the infrared rays received on the inner face of the external wall.

6. The lip according to claim 1, wherein the upstream wall comprises an inner face that is configured to reflect at least 50% of the infrared rays received on the inner face of the upstream wall.

7. The lip according to claim 1, wherein the partition wall comprises an inner face that is configured to reflect at least 50% of the infrared rays received on the inner face of the partition wall.

8. The lip according to claim 1, further comprising an ice detection means configured to deactivate a source for the infrared rays emission when no ice is presence.

9. The lip according to claim 1, wherein the external wall or the upstream wall is made of a material configured to transmit, on an outer face of said wall, at least 30% of the infrared rays received on an inner face of said wall.

10. An air intake of an aircraft turbomachine nacelle extending along an axis X in which an air flow circulates from upstream to downstream, the air intake comprising the lip according to claim 1.

11. A method for de-icing the lip according to claim 1, the method comprising:
   a step of activating a source of the infrared rays in the annular cavity so as to emit the infrared rays on the inner face of at least one wall selected from the internal wall, the external wall, and the upstream wall, and
   a step of transmitting, to the outer face of said wall having received the infrared rays, at least 30% of the infrared rays received on the inner face of said wall.

12. The method for de-icing according to claim 11, further comprising a step of detecting whether ice is present on the outer face of said wall having the received infrared rays, and a step of inhibiting the source of the infrared rays when ice is not present.

13. A lip of an air intake of an aircraft turbomachine nacelle extending along an axis X in which an air flow circulates from upstream to downstream, the lip annularly extending about the axis X and comprising:
   an upstream wall having an inner face, the upstream wall connected to an internal wall and an external wall; the internal wall comprising an inner face and the external wall comprising an inner face;
   an annular cavity defined by the inner face of the upstream wall and a partition wall that is connected to the inner face of the internal wall and the inner face of the external wall;
   an infrared emission source housed in the annular cavity at a location of the annular cavity between the partition wall and the upstream wall; and
   at least one of the upstream wall, the internal wall, and the external wall is made of a material in which at least 30% of infrared rays received on the inner face thereof transmit through and out an outer face thereof, and the lip comprising at least one circumferential transparent wall mounted to the partition wall in the annular cavity so as to delimit an annular duct, and wherein the at least one infrared emission source is mounted in said annular duct.

14. The lip according to claim 13, wherein at least two of the upstream wall, the internal wall, and the external wall are made each of the material.

15. The lip according to claim 13, wherein at a portion the inner face of the external wall or the internal wall is made of a reflective material that reflects at least 50% of infrared rays received by said inner face with said reflective material.

16. The lip according to claim 13, wherein the material is glass ceramic, polyethylene, polycarbonate, or polymethyl methacrylate.

17. The lip according to claim 13, further comprising at least one ventilation inlet and at least one ventilation outlet form in the external wall or the partition wall.

18. A lip of an air intake of an aircraft turbomachine nacelle extending along an axis X in which an air flow circulates from upstream to downstream, the lip annularly extending about the axis X and comprising:
   an upstream wall having an inner face, the upstream wall connected to an internal wall and an external wall; the internal wall comprising an inner face and the external wall comprising an inner face;
   an annular cavity defined by the inner face of the upstream wall and a partition wall that is connected to the inner face of the internal wall and the inner face of the external wall;

an infrared emission source housed in the annular cavity at a location of the annular cavity between the partition wall and the upstream wall; and at least one of the upstream wall, the internal wall, and the external wall is made of a material in which at least 30% of infrared rays received on the inner face thereof transmit through and out an outer face thereof; and a Fresnel surface located in the annular cavity to guide the infrared rays.

19. The lip according to claim 18, wherein the internal wall comprises at least one first portion made of a material configured to transmit, on an outer face of said wall, at least 60% of the infrared rays received on an inner face of said wall.

20. The lip according to claim 19, wherein the internal wall comprises at least one second portion which comprises an inner face that is configured to reflect at least 50% of the infrared rays received on the inner face of the internal wall.

* * * * *